(12) United States Patent
Endo (10) Patent No.: US 9,113,170 B2
(45) Date of Patent: Aug. 18, 2015

(54) MOTION VECTOR DECISION APPARATUS, MOTION VECTOR DECISION METHOD AND COMPUTER READABLE STORAGE MEDIUM

(75) Inventor: Hiroaki Endo, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 659 days.

(21) Appl. No.: 13/076,759

(22) Filed: Mar. 31, 2011

(65) Prior Publication Data

US 2011/0249747 A1 Oct. 13, 2011

(30) Foreign Application Priority Data

Apr. 12, 2010 (JP) ................................. 2010-091826

(51) Int. Cl.
| H04N 7/12 | (2006.01) |
| H04N 11/02 | (2006.01) |
| H04N 11/04 | (2006.01) |
| G06K 9/36 | (2006.01) |
| G06K 9/46 | (2006.01) |
| H04N 19/567 | (2014.01) |
| H04N 19/61 | (2014.01) |
| H04N 19/513 | (2014.01) |

(52) U.S. Cl.
CPC ........... *H04N 19/567* (2014.11); *H04N 19/521* (2014.11); *H04N 19/61* (2014.11)

(58) Field of Classification Search
None
See application file for complete search history.

(56) References Cited

U.S. PATENT DOCUMENTS

| 5,889,890 | A | 3/1999 | Heimburger |
| 6,275,532 | B1 * | 8/2001 | Hibi et al. ................ 375/240.17 |
| 7,075,989 | B2 | 7/2006 | Murakami et al. |
| 7,161,983 | B2 * | 1/2007 | Lainema et al. ......... 375/240.16 |
| 7,224,734 | B2 * | 5/2007 | Suzuki et al. .............. 375/240.2 |
| 8,204,113 | B2 | 6/2012 | Kondo et al. |
| 2004/0202245 | A1 | 10/2004 | Murakami et al. |
| 2005/0025342 | A1 * | 2/2005 | Lee et al. ....................... 382/107 |
| 2005/0243929 | A1 * | 11/2005 | Hubrich et al. .......... 375/240.16 |
| 2008/0317131 | A1 * | 12/2008 | Lee et al. ................. 375/240.16 |
| 2009/0033750 | A1 * | 2/2009 | Batur ........................ 348/208.1 |
| 2009/0129472 | A1 * | 5/2009 | Panusopone et al. .... 375/240.16 |

(Continued)

FOREIGN PATENT DOCUMENTS

| JP | 04-035384 A | 2/1992 |
| JP | 09-233479 A | 9/1997 |
| JP | 10-075453 A | 3/1998 |
| JP | 11-243551 A | 9/1999 |

(Continued)

OTHER PUBLICATIONS

The above references were cited in a Nov. 18, 2013 Japanese Office Action, a copy of which is not enclosed, that issued in Japanese Patent Application No. 2010-091826.

*Primary Examiner* — Joseph Ustaris
*Assistant Examiner* — Rebecca Volentine
(74) *Attorney, Agent, or Firm* — Cowan, Liebowitz & Latman, P.C.

(57) ABSTRACT

A motion vector decision apparatus used in a moving image encoding apparatus for performing inter-prediction encoding of an encoding target image using a reference image and a motion vector, which decides the motion vector based on a cost calculated using a first weight coefficient as a weight coefficient when a block image included in an encoding target image includes no repetitive pattern, and decides the motion vector based on a cost calculated using a second weight coefficient larger than the first weight coefficient as the weight coefficient when the block image includes the repetitive pattern.

13 Claims, 5 Drawing Sheets

(56) References Cited

U.S. PATENT DOCUMENTS

| | | | |
|---|---|---|---|
| 2009/0161763 A1* | 6/2009 | Rossignol et al. | 375/240.16 |
| 2009/0232216 A1* | 9/2009 | Kurata | 375/240.16 |
| 2009/0257491 A1 | 10/2009 | Kondo et al. | |
| 2010/0026888 A1* | 2/2010 | Pearlstein et al. | 348/441 |
| 2010/0027666 A1* | 2/2010 | Tetsukawa et al. | 375/240.16 |

FOREIGN PATENT DOCUMENTS

| | | |
|---|---|---|
| JP | 2008-154072 | 7/2008 |
| JP | 2008-171247 A | 7/2008 |
| JP | 2009-290803 A | 12/2009 |
| WO | 2007/010901 A1 | 1/2007 |

\* cited by examiner

MOTION VECTOR DECISION APPARATUS, MOTION VECTOR DECISION METHOD AND COMPUTER READABLE STORAGE MEDIUM

BACKGROUND OF THE INVENTION

1. Field of the Invention

The present invention relates to a motion vector decision apparatus and a motion vector decision method in a moving image encoding apparatus and a recording medium.

2. Description of the Related Art

A digital video camera is well known as a moving image recoding apparatus with an integrated camera, which captures an object image and compress-codes and records moving image data obtained by the image capturing. Recording media that record moving image data have recently shifted from conventional magnetic tapes to disk media and semiconductor memories which are convenient because of, for example, their random accessibility. As a compression method, MPEG-2 is generally used because it allows compression at a high compression ratio using inter-frame motion prediction. In recent years, H.264 that enables compression at a higher compression ratio or the like is also used.

An encoding apparatus using such a compression method searches for a motion vector between frames for each macroblock that is the unit of encoding obtained by dividing a frame image, and performs motion compensation to decrease the information amount.

The information amount of an image signal is decreased by the motion compensation. In moving image encoding, however, motion information also needs to be encoded. Hence, when searching for a motion vector, it is necessary to consider not only image similarity (distortion amount) but also the code amount of a motion vector and the like. Typically, an encoding cost C to be used to decide a motion vector is obtained using an evaluation function given by $$C = D + \lambda R \quad (1)$$

where D is the encoding distortion, R is the generated code amount, and λ is a coefficient, and a motion vector is searched for based on the encoding cost. As the encoding distortion D, the difference amount between the original image and the predicted image and, more particularly, the sum of squares of differences, the sum of absolute differences, or the like is used. As the generated code amount R and the coefficient λ, the code amount of a motion vector and a quantization step are generally used, respectively.

In the above-described compression method, the generated code amount R of a motion vector is calculated based on the difference amount from an estimated motion vector obtained from neighboring motion vectors. When searching for a motion vector, the neighboring motion vectors are not always correctly obtained, and the generated code amount R may not be correctly evaluated. Japanese Patent Laid-Open No. 2008-154072 describes a method of coping with this.

SUMMARY OF THE INVENTION

The method disclosed in Japanese Patent Laid-Open No. 2008-154072 improves the evaluation of code amount. However, when an image has a repetitive pattern like a building's windows, an appropriate motion vector cannot be searched for, causing window frames to flicker in a decoded image, which results in degradation that is very noticeable to the eyes.

The present invention allows an appropriate motion vector to be searched for even in an image having a repetitive pattern.

One aspect of embodiments of the present invention relates to a motion vector decision apparatus used in a moving image encoding apparatus for performing inter-prediction encoding of an encoding target image using a reference image and a motion vector, comprises a vector setting unit adapted to sequentially select and set one of a plurality of candidate vectors serving as candidates of the motion vector, a difference calculation unit adapted to calculate a difference in pixel value between a block image included in the encoding target image, and a block image included in the reference image and corresponding to the candidate vector set by the vector setting unit, an order storage unit adapted to store, out of the differences calculated for all of the plurality of candidate vectors, a predetermined number of differences in ascending order, a vector storage unit adapted to store the predetermined number of candidate vectors corresponding to the differences stored in the order storage unit, a determination unit adapted to determine whether the block image of the encoding target image includes a repetitive pattern, based on distances between, out of the predetermined number of candidate vectors stored in the vector storage unit, a candidate vector corresponding to a minimum difference stored in the order storage unit and remaining candidate vectors, a vector code amount calculation unit adapted to calculate a vector code amount of each of the plurality of candidate vectors, and a motion vector decision unit adapted to calculate a cost for each of the plurality of candidate vectors by adding a corresponding difference to a result of multiplication of the vector code amount and a weight coefficient, and deciding a candidate vector with a minimum cost as a motion vector for the block image included in the encoding target image. Wherein the motion vector decision unit decides the motion vector based on the cost calculated using a first weight coefficient as the weight coefficient when the determination unit determines that the block image includes no repetitive pattern, and decides the motion vector based on the cost calculated using a second weight coefficient larger than the first weight coefficient as the weight coefficient when the determination unit determines that the block image includes the repetitive pattern.

Another aspect of the embodiments of the present invention relates to a motion vector decision apparatus used in a moving image encoding apparatus for performing inter-prediction encoding of an encoding target image including a repetitive pattern using a reference image and a motion vector, comprises a vector setting unit adapted to sequentially select and setting one of a plurality of candidate vectors serving as candidates of the motion vector, a difference calculation unit adapted to calculate a difference in pixel value between a block image included in the encoding target image, and a block image included in the reference image and corresponding to the candidate vector set by the vector setting unit, a vector code amount calculation unit adapted to calculate a vector code amount of each of the plurality of candidate vectors, and a motion vector decision unit adapted to calculate a cost for each of the plurality of candidate vectors based on a corresponding difference and a result of multiplication of the vector code amount and a predetermined weight coefficient, and deciding a candidate vector with a minimum cost as a motion vector for the block image included in the encoding target image. Wherein the motion vector decision unit changes a value of the predetermined weight coefficient between a case in which the block image included in the encoding target image includes the repetitive pattern and a case in which the block image included in the encoding target image includes no repetitive pattern.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Embodiments of the present invention will now be described with reference to the accompanying drawings.

First Embodiment

Figure 1:
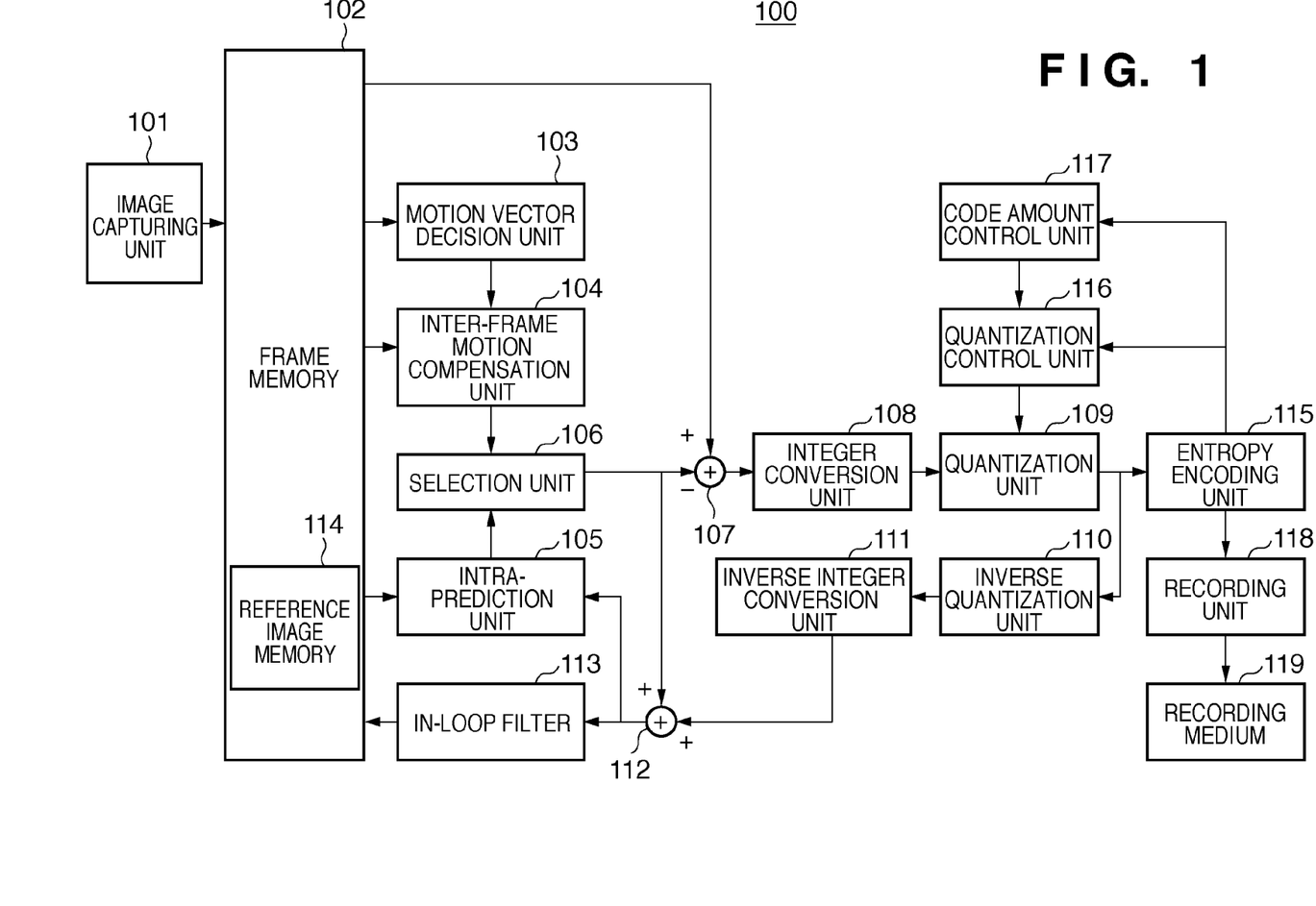
FIG. 1 is a block diagram showing an example of the arrangement of a moving image encoding apparatus according to an embodiment.

FIG. 1 is a block diagram showing an example of the arrangement of a moving image encoding apparatus 100 according to the embodiment. The apparatus includes an image capturing unit 101 including a camera unit with a lens, an image sensor, and the like, a frame memory 102, a motion vector decision unit 103 that searches for motion vectors, and an inter-frame motion compensation unit 104 that generates inter-predicted image data based on the motion vectors. The apparatus also includes an intra-prediction unit 105 that generates intra-predicted image data, a selection unit 106 that selects one of the inter-predicted image data and the intra-predicted image data, a subtracter 107, an integer conversion unit 108, and a quantization unit 109. The apparatus also includes an inverse quantization unit 110, an inverse integer conversion unit 111, an adder 112, an in-loop filter 113, an entropy encoding unit 115, a quantization control unit 116, a code amount control unit 117, and a recording unit 118. A recording medium 119 is attached to the moving image encoding apparatus 100. The frame memory 102 includes a reference image memory 114 that stores a reference image to be used for inter-prediction.

The blocks of the moving image encoding apparatus 100 shown in FIG. 1 may be constituted by hardware using dedicated logic circuits and memories. Alternatively, the blocks may be constituted using software by causing a CPU to execute processing programs stored in a memory.

Moving image data obtained from image capturing carried out by the image capturing unit 101 is stored in the frame memory 102 as the first frame, second frame, third frame, ... sequentially in the generation order. The image data is extracted from the frame memory 102 in the encoding order of, for example, third frame, first frame, second frame, . . . .

Encoding methods include intra-prediction encoding that encodes only image data within frames and inter-prediction encoding that encodes also predicted image data between frames. Pictures used in inter-prediction encoding are a P picture that makes prediction between the unit of motion compensation (MC block) and one reference frame and a B picture that makes prediction between the MC block and two reference frames. On the other hand, intra-prediction encoding uses an I picture. Note that the frames are encoded in the order different from the frame input order so as to enable not only prediction for a past frame but also prediction (backward prediction) with respect to a future frame in terms of time.

When performing intra-prediction encoding, the image data of an encoding target block serving as an encoding unit is read out from the frame memory 102 and input to the intra-prediction unit 105. In this embodiment, one encoding target block is formed from 16×16 pixels. The data of pixels adjacent to the readout encoding target block are also read out from the frame memory 102 and input to the intra-prediction unit 105.

The intra-prediction unit 105 performs block matching between the encoding target block and a plurality of intra-predicted image data generated from the data of the pixels adjacent to the encoding target block. Intra-predicted image data having the highest correlation is selected and output to the selection unit 106. When performing intra-prediction encoding, the selection unit 106 always selects the output from the intra-prediction unit 105 and outputs the intra-predicted image data to the subtracter 107.

The subtracter 107 receives the intra-predicted image data and the block image data of the encoding target image read out from the frame memory 102, and outputs, to the integer conversion unit 108, the difference image data of pixel values between the block image of the encoding target image and the intra-predicted image. The integer conversion unit 108 performs integer conversion for the input difference image data of pixel values. The quantization unit 109 quantizes the signal that has undergone the integer conversion of the integer conversion unit 108.

The entropy encoding unit 115 entropy-encodes conversion coefficients quantized by the quantization unit 109, and outputs them to the recording unit 118 as a data stream. Quantization coefficients in the quantization unit 109 are calculated by the quantization control unit 116 based on a code amount generated by the entropy encoding unit 115 and a target code amount set by the code amount control unit 117. The recording unit 118 records, in the recording medium 119, the data stream output from the entropy encoding unit 115.

The conversion coefficients quantized by the quantization unit 109 are also input to the inverse quantization unit 110. The inverse quantization unit 110 inversely quantizes the input conversion coefficients. The inverse integer conversion unit 111 performs inverse integer conversion processing for the inversely quantized signal.

The adder 112 receives and adds the data that has undergone the inverse integer conversion processing and the intra-predicted image data generated by the intra-prediction unit 105. The added data is decoded reconstructed image data which is input to the intra-prediction unit 105 and used to generate intra-predicted image data. The reconstructed image data is also subjected to encoding distortion reduction processing by the in-loop filter 113 and is stored in the reference image memory 114 as reference image data to be used in inter-prediction encoding to be described later.

On the other hand, when performing inter-prediction encoding, the block image of an encoding target image serving as an encoding unit is read out from the frame memory 102 and input to the motion vector decision unit 103. The motion vector decision unit 103 reads out reference image data from the reference image memory 114, decides motion vectors based on the reference image and the block image of the encoding target image, and notifies the inter-frame motion compensation unit 104 of them.

The inter-frame motion compensation unit 104 generates inter-predicted image data using the motion vectors decided by the motion vector decision unit 103 and the reference image obtained from the frame memory 102, and supplies the inter-predicted image data to the selection unit 106 together with the motion vectors. When performing inter-prediction encoding, the selection unit 106 selects the inter-predicted image data and supplies it to the subtracter 107.

Note that in some frames, inter-prediction or intra-prediction can be selected for each encoding target block. When performing intra-prediction, the above-described operation is performed, and the intra-prediction result is sent to the selection unit 106. When performing inter-prediction, the selection unit 106 selects the inter-predicted image data from the inter-frame motion compensation unit 104 and outputs it to the subtracter 107. Based on the inter-prediction result from the motion vector decision unit 103 and the intra-prediction result from the intra-prediction unit 105, the selection unit 106 can select, for example, a prediction method with a smaller difference value.

The subtracter 107 calculates the difference between the predicted image and the block image of the encoding target image to generate difference image data. The difference image data is output to the integer conversion unit 108. Subsequent processing is the same as that in the above-described intra-prediction encoding.

Figure 2:
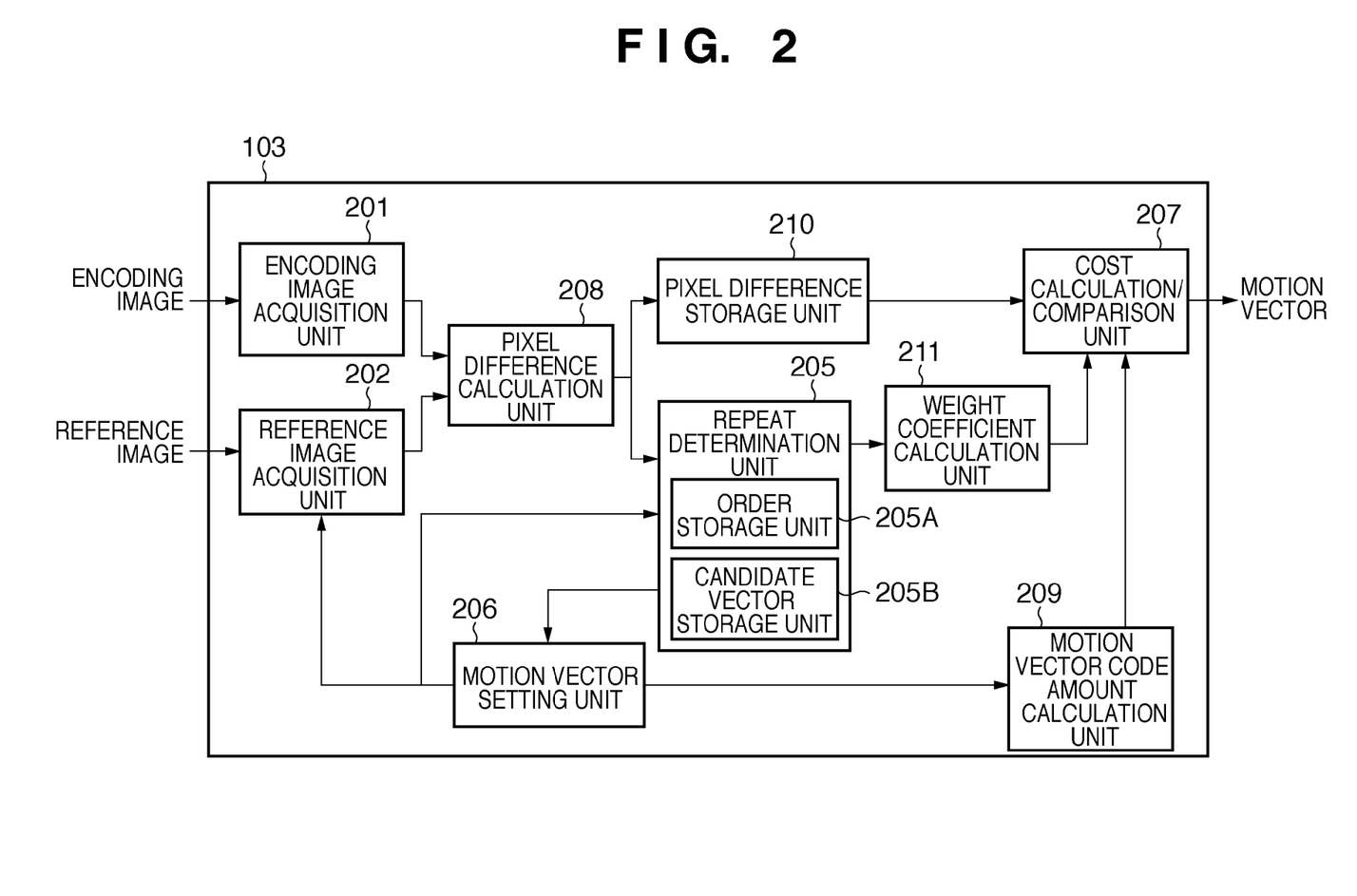
FIG. 2 is a block diagram showing an example of the arrangement of a motion vector decision unit according to the first embodiment.

The operation of the motion vector decision unit 103 that calculates a motion vector will be described next in detail. FIG. 2 is a block diagram showing an example of the detailed arrangement of the motion vector decision unit 103 according to this embodiment.

Referring to FIG. 2, an encoding image acquisition unit 201 acquires the block image of an encoding target image from the frame memory 102. A motion vector setting unit 206 sequentially selects one motion vector from a plurality of motion vector candidates as a candidate vector, and sets it in a reference image acquisition unit 202.

The reference image acquisition unit 202 acquires, from the reference image memory 114 of the frame memory 102, the block image of a reference image corresponding to the motion vector set by the motion vector setting unit 206. The acquired block images of the encoding target image and the reference image are input to a pixel difference calculation unit 208.

The pixel difference calculation unit 208 calculates the sum of absolute differences between the pixel values of the block image of the encoding target image and those of the block image of the reference image, thereby calculating the pixel difference. Note that in this embodiment, the pixel difference calculation unit 208 calculates the sum of absolute differences. However, the pixel difference calculation unit 208 may calculate a value based on the differences between pixel values by, for example, calculating the sum of the absolute values of coefficient values obtained by Hadamard-transforming the difference values between pixel values. The pixel differences for the plurality of candidate vectors are sequentially calculated and transmitted to a repeat determination unit 205 and also stored in a pixel difference storage unit 210.

The repeat determination unit 205 includes an order storage unit 205A and a candidate vector storage unit 205B. The order storage unit 205A stores, out of the pixel differences calculated by the pixel difference calculation unit 208, a predetermined number of (for example, five) pixel differences sequentially in ascending order. The candidate vector storage unit 205B stores a predetermined candidate vectors corresponding to the pixel differences stored in the order storage unit 205A.

Figure 3:
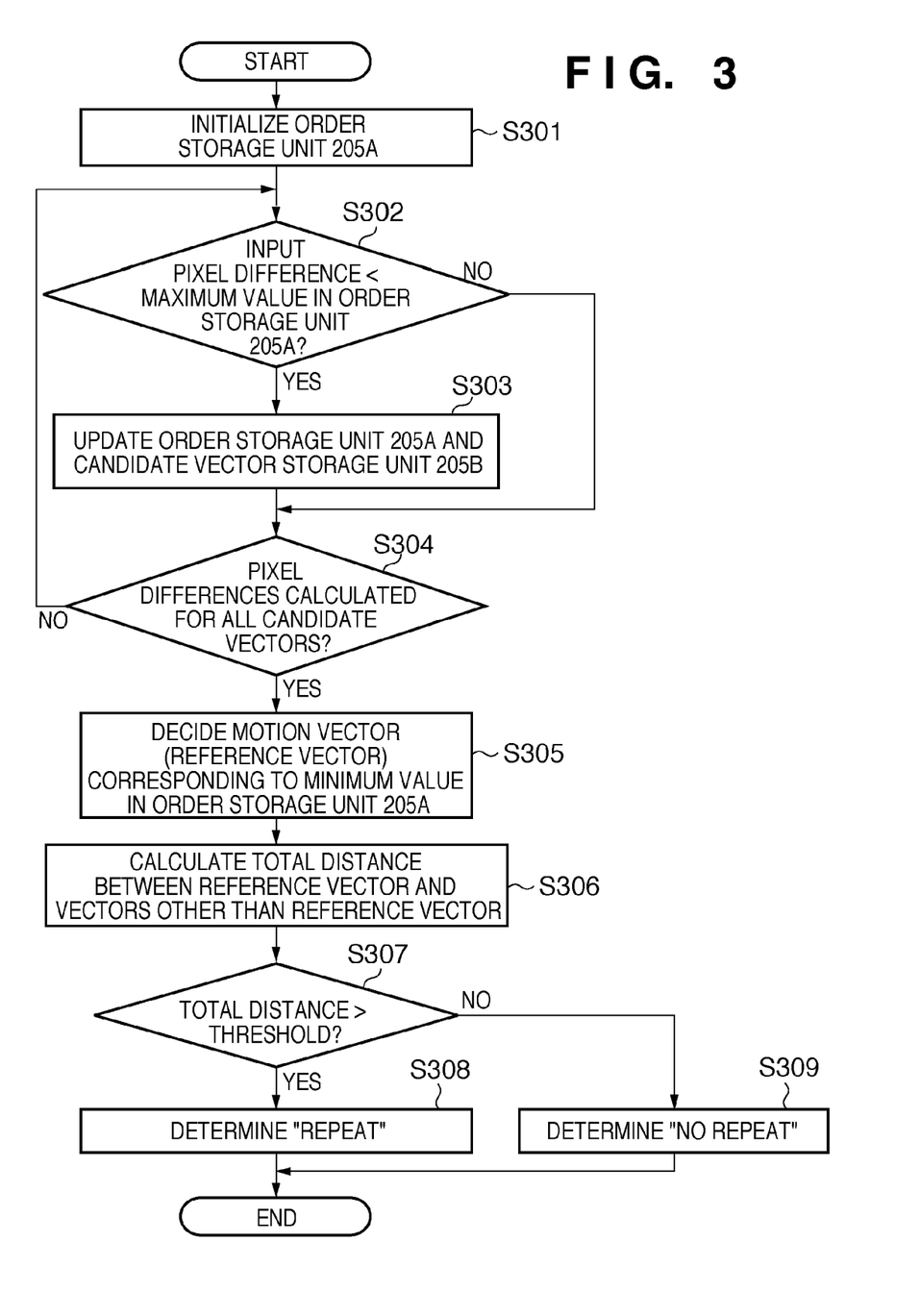
FIG. 3 is a flowchart for explaining the operation of a repeat determination unit 205.

The operation of the repeat determination unit 205 will be described next in detail. FIG. 3 is a flowchart for explaining the operation of the repeat determination unit 205. When processing of the block image of the encoding target image starts, the repeat determination unit 205 initializes the pixel difference order storage unit 205A to the maximum value in step S301. In step S302, the repeat determination unit 205 sequentially compares the pixel difference input to it with the maximum value of the pixel difference stored in the order storage unit 205A. If the input pixel difference is smaller (YES in step S302), the process advances to step S303. Otherwise (NO in step S302), the process advances to step S304. In step S303, the repeat determination unit 205 updates the pixel difference value stored in the order storage unit 205A and the corresponding motion vector stored in the candidate vector storage unit 205B.

In step S304, the repeat determination unit 205 determines whether the pixel difference has been calculated for all of the plurality of candidate vectors. This determination can be done based on whether, for example, the number of input pixel differences matches the total number of candidate vectors. If not all pixel differences have been calculated (NO in step S304), the process returns to step S302 to continue the processing. If all pixel differences have been calculated (YES in step S304), the process advances to step S305. At this time, the predetermined number of (in the above example, five) pixel differences out of those corresponding to all the candidate vectors are stored in the order storage unit 205A in ascending order.

Figure 4A:
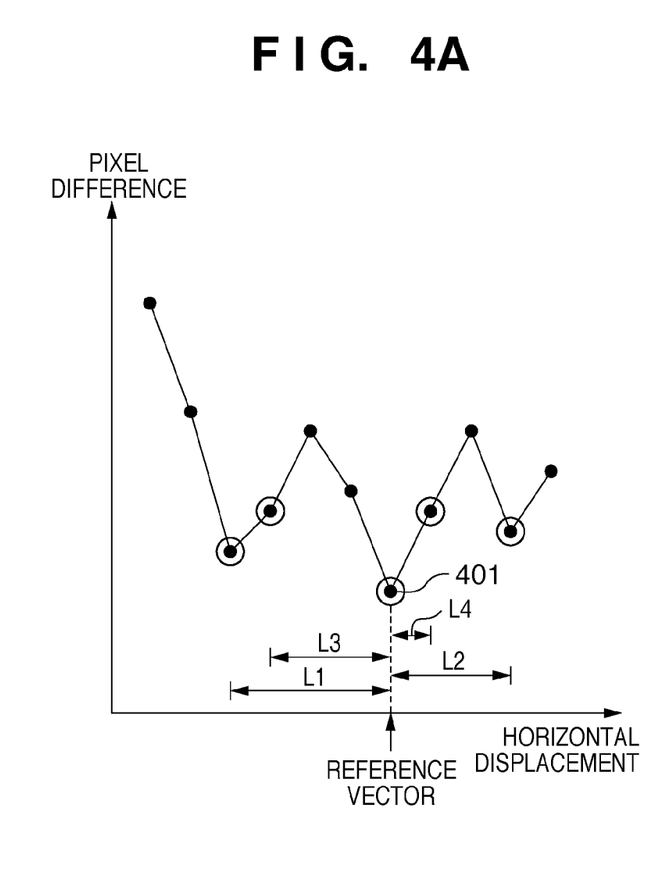
FIGS. 4A and 4B are graphs showing the relationship between a pixel difference and a candidate vector.
Figure 4B:
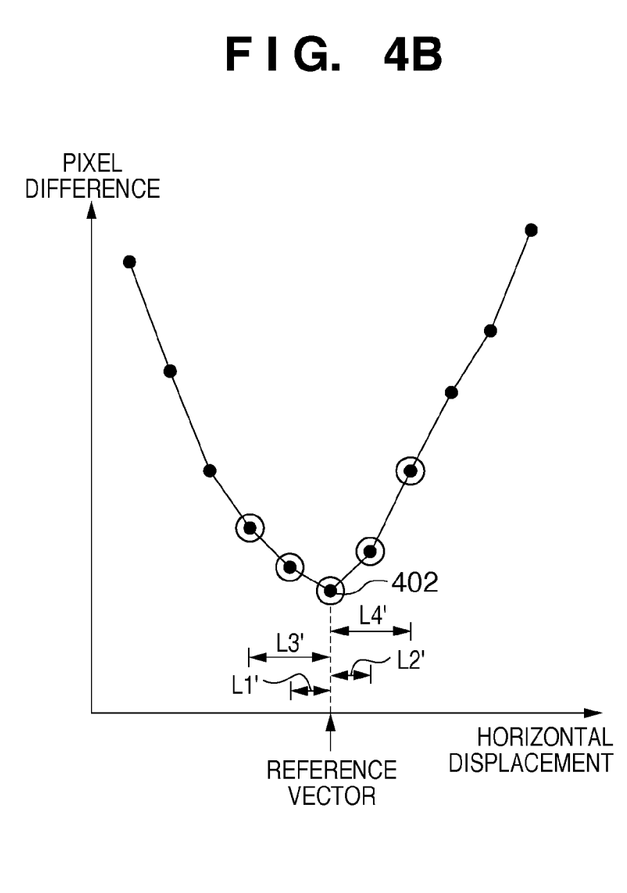

The relationship between a candidate vector and a pixel difference will be described with reference to FIGS. 4A and 4B. FIGS. 4A and 4B are graphs showing the relationship between a candidate vector and a corresponding pixel difference. The abscissa represents the magnitude of a candidate vector as a horizontal displacement, and the ordinate represents pixel differences calculated for the candidate vectors. Note that although actual candidate vectors are selected two-dimensionally, FIGS. 4A and 4B show only displacements in the horizontal direction for the descriptive convenience. FIG. 4A shows an example of the relationship between a pixel difference and a candidate vector when the block image of the encoding target image includes a repetitive pattern. On the other hand, FIG. 4B shows an example of the relationship between a pixel difference and a candidate vector when the block image of the encoding target image includes no repetitive pattern. In FIGS. 4A and 4B, circled pixel differences correspond to the five pixel differences selected from the pixel differences of all the candidate vectors in ascending order.

Referring back to FIG. 3, in step S305, the repeat determination unit 205 detects the minimum pixel difference out of the predetermined number of pixel differences stored in the order storage unit 205A, and decides the corresponding candidate vector as a reference vector. In step S306, the repeat determination unit 205 calculates the sum of the distances between the reference vector and the remaining candidate vectors stored in the candidate vector storage unit 205B other than the reference vector. The difference between the reference vector and each of the remaining candidate vectors can be calculated as a value obtained by adding the differences in the horizontal component and the vertical component between the vectors. The total distance is the adding result of the distances calculated for the respective candidate vectors.

In step S307, the repeat determination unit 205 compares the total distance with a threshold. If the total distance is larger than the threshold (YES in step S307), the process advances to step S308 to determine "repeat". If the total distance is equal to or smaller than the threshold (NO in step S307), the process advances to step S309 to determine "no repeat".

This will be described with reference to FIGS. 4A and 4B. In FIG. 4A, the pixel difference indicated by a circle 401 has the minimum value, and a corresponding candidate vector is the reference vector. The distances between the reference vector and the remaining candidate vectors are represented by L1, L2, L3, and L4. Hence, the total distance $L_{total}$=L1+L2+L3+L4.

On the other hand, in FIG. 4B, the pixel difference indicated by a circle 402 has the minimum value, and a corresponding candidate vector is the reference vector. The distances between the reference vector and the remaining candidate vectors are represented by L1', L2', L3', and L4'. Hence, the total distance $L_{total}'$=L1'+L2'+L3'+L4'. At this time, $L_{total}$>$L_{total}'$. As is apparent, the total distance is larger in FIG. 4A where the image includes a repetitive pattern than in FIG. 4B where the image includes no repetitive pattern. As described above, it is possible to detect a repetitive pattern by using the distances between the reference vector and the remaining candidate vectors.

After the repeat determination processing according the flowchart of FIG. 3 has ended, the repeat determination unit 205 outputs a signal (flag value) representing "repeat" or "no repeat" to a weight coefficient calculation unit 211. Upon receiving a flag value representing "no repeat", the weight coefficient calculation unit 211 outputs a predetermined first weight coefficient W1 to a cost calculation/comparison unit 207. Upon receiving a flag value representing "repeat", the weight coefficient calculation unit 211 outputs a predetermined second weight coefficient W2. At this time, W1<W2 holds. Note that W2 is preferably set to such a value that increases the weighting of the vector code amount but does not completely eliminate the influence of the pixel difference on the cost. An optimum value can be obtained by simulation or the like.

The repeat determination unit 205 also notifies the motion vector setting unit 206 of the completion of the repeat determination processing. The motion vector setting unit 206 sequentially performs the same candidate vector setting again in accordance with the notification, and outputs candidate vectors to a vector code amount calculation unit 209. The motion vector code amount calculation unit 209 calculates the motion vector code amounts of the input candidate vectors in accordance with a known code amount calculation method. Note that the vector code amounts of the candidate vectors may be calculated at the same timing as that of calculation of pixel differences corresponding to the candidate vectors by the pixel difference calculation unit 208.

Finally, the cost calculation/comparison unit 207 calculates and compares the costs of the candidate vectors, thereby performing motion vector decision processing. To do this, the pixel differences corresponding to the candidate vectors are read out from the pixel difference storage unit 210 to the cost calculation/comparison unit 207. In addition, the vector code amounts of the candidate vectors are read out from the vector code amount calculation unit 209 to the cost calculation/comparison unit 207 together with the candidate vectors. The cost calculation/comparison unit 207 multiplies the vector code amounts by the weight coefficient acquired from the weight coefficient calculation unit 211, and adds pixel differences corresponding to the products, thereby calculating the cost of each candidate vector.

The cost calculation/comparison unit 207 determines whether each sequentially calculated cost value is smaller than the minimum one of the cost values calculated so far. If the cost value is smaller, the minimum value is updated, and the vector information of the corresponding candidate vector is stored together. The candidate vector that is stored at the time the cost calculation/comparison has ended for all candidate vectors is decided as the motion vector for the encoding target block.

As described above, as a characteristic feature of this embodiment, when calculating the costs of candidate vectors, the weight coefficient to multiply the vector code amount of each candidate vector is changed between a case in which the encoding target image includes a repetitive pattern and a case in which the encoding target image includes no repetitive pattern. More specifically, when the image includes a repetitive pattern, the weight of the vector code amount is increased. This allows to more easily select a candidate vector with a small vector code amount. That is, the candidate vector with the small vector code amount is more readily selected as a motion vector when the image includes a repetitive pattern than when the image includes no repetitive pattern. This makes it possible to search for an appropriate motion vector without sacrificing the encoding efficiency even when an encoding target block is part of a repetitive image.

Second Embodiment

Figure 5:
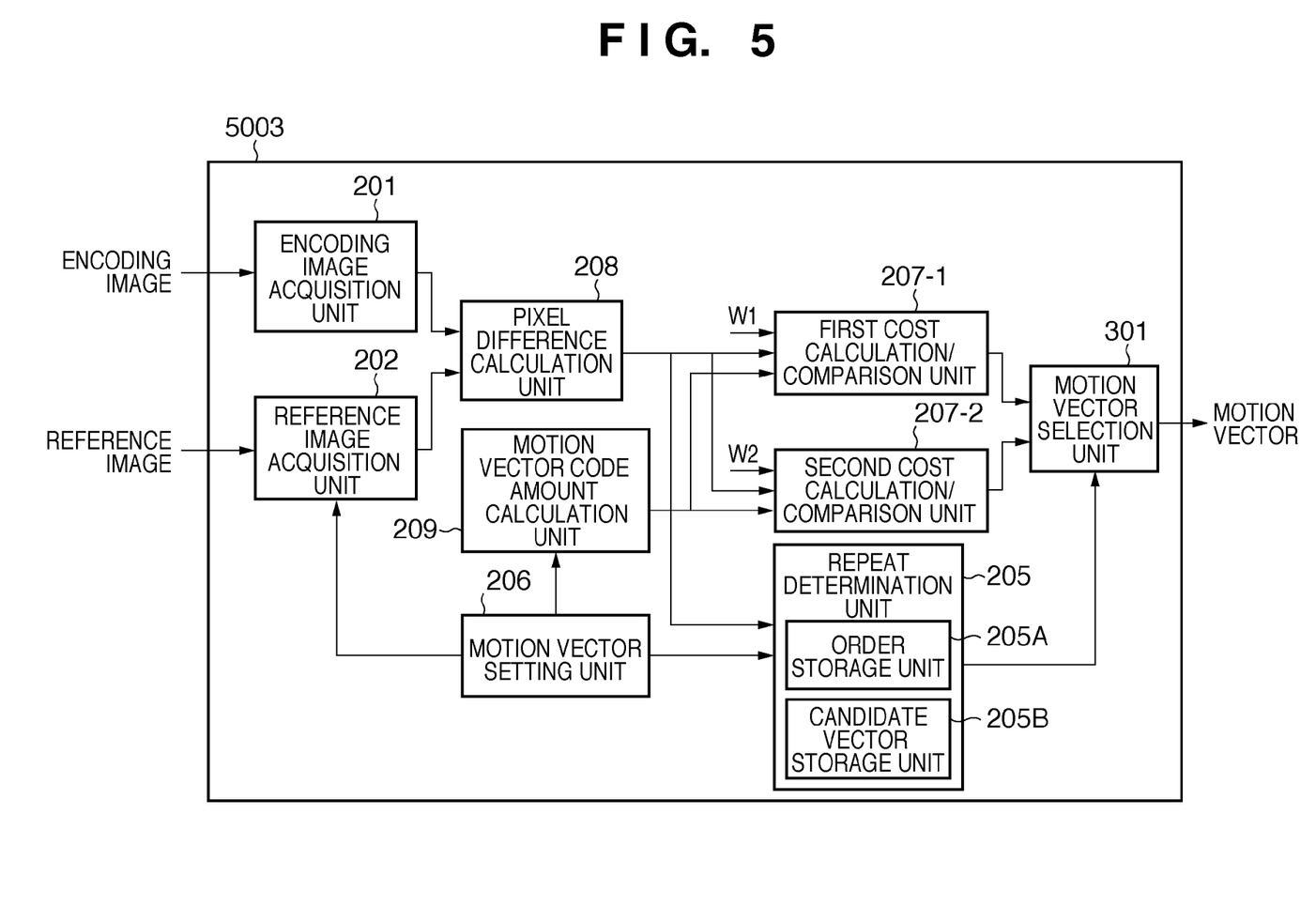
FIG. 5 is a block diagram showing an example of the arrangement of a motion vector decision unit according to the second embodiment.

A moving image encoding apparatus according to the second embodiment of the present invention will be described below. FIG. 5 is a block diagram showing an example of the detailed arrangement of a motion vector decision unit 5003 according to this embodiment. The arrangement of the moving image encoding apparatus is the same as that of the first embodiment. The image encoding apparatus according to the second embodiment is formed by replacing the motion vector decision unit 103 in FIG. 1 with the motion vector decision unit 5003 in FIG. 5.

Referring to FIG. 5, an encoding image acquisition unit 201 acquires the block image of an encoding target image from a frame memory 102. A motion vector setting unit. 206 sequentially selects one candidate vector from a plurality of candidate vectors, and sets it in a reference image acquisition unit 202.

The reference image acquisition unit 202 acquires, from a reference image memory 114 of the frame memory 102, reference image data corresponding to the candidate vector set by the motion vector setting unit 206. The acquired encoding target block image data and reference image data are input to a pixel difference calculation unit 208.

The pixel difference calculation unit 208 calculates the sum of absolute differences between the pixel values of the encoding target block image and those of the reference image, thereby calculating the pixel difference. Note that in this embodiment, the pixel difference calculation unit 208 calculates the sum of absolute differences. However, the pixel difference calculation unit 208 may calculate a value based on the differences between pixel values by, for example, calculating the sum of the absolute values of coefficient values obtained by Hadamard-transforming the difference values between pixel values. The candidate vectors output from the motion vector setting unit 206 are input to a vector code amount calculation unit 209 so as to calculate the vector code amount of each candidate vector.

The pixel differences and the vector code amounts are input to a first cost calculation/comparison unit 207-1 and a second cost calculation/comparison unit 207-2. Different weight coefficients W1 and W2 (W1<W2) are set in the two, first and second cost calculation/comparison units 207, respectively. Note that the method of setting W2 is the same as in the first embodiment. Each cost calculation/comparison unit multiplies the vector code amounts by the set weight coefficient, and adds the pixel differences, thereby calculating the cost corresponding to each candidate vector. Each cost calculation/comparison unit determines whether each sequentially calculated cost is smaller than the minimum one of the costs calculated so far. If the cost is smaller, the minimum value is updated, and corresponding vector information is stored together. The candidate vector that is stored at the time the cost calculation has ended for all candidate vectors is decided as the motion vector for the encoding target block. That is, the cost calculation/comparison units 207 output two motion vectors. The two motion vectors are input to a motion vector selection unit 301.

On the other hand, the pixel differences calculated for the respective candidate vectors are output from the pixel difference calculation unit 208 to a repeat determination unit 205 as well. The candidate vectors set by the motion vector setting unit 206 are also output to the repeat determination unit 205. The repeat determination unit 205 performs repeat determination as in the first embodiment, and outputs, to the motion vector selection unit 301, a flag signal representing whether the encoding target image includes a repetitive pattern. The motion vector selection unit 301 can be configured as a switch so as to select the motion vector calculated by the second cost calculation/comparison unit 207-2 when the repeat determination unit 205 determines "repeat". On the other hand, upon determining "no repeat", the motion vector selection unit 301 selects the motion vector calculated by the first cost calculation/comparison unit 207-1. The thus selected motion vector is decided as the motion vector for the encoding target block.

In this embodiment as well, it is possible to search for an appropriate motion vector without sacrificing the encoding efficiency even when an encoding target block is part of a repetitive image.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-091826, filed Apr. 12, 2010, which are hereby incorporated by reference herein in their entirety.

What is claimed is:

1. A motion vector decision apparatus used in a moving image encoding apparatus for performing inter-prediction encoding of an encoding target image using a reference image and a motion vector, comprising:
    a vector setting unit adapted to sequentially select and set one of a plurality of candidate vectors serving as candidates of the motion vector;
    a difference calculation unit adapted to calculate a difference in pixel value between a block image included in the encoding target image, and a block image included in the reference image and corresponding to the candidate vector set by said vector setting unit;
    an order storage unit adapted to store, out of the differences calculated for all of the plurality of candidate vectors, a predetermined number of differences in ascending order;
    a vector storage unit adapted to store the predetermined number of candidate vectors corresponding to the differences stored in said order storage unit;
    a determination unit adapted to determine whether the block image of the encoding target image includes a repetitive pattern, based on distances between, out of the predetermined number of candidate vectors stored in said vector storage unit, a candidate vector corresponding to a minimum difference stored in said order storage unit and remaining candidate vectors;
    a vector code amount calculation unit adapted to calculate a vector code amount of each of the plurality of candidate vectors; and
    a motion vector decision unit adapted to calculate a cost for each of the plurality of candidate vectors by adding a corresponding difference to a result of multiplication of the vector code amount and a weight coefficient, and deciding a candidate vector with a minimum cost as a motion vector for the block image included in the encoding target image,
    wherein said motion vector decision unit
    decides the motion vector based on the cost calculated using a first weight coefficient as the weight coefficient when said determination unit determines that the block image includes no repetitive pattern, and
    decides the motion vector based on the cost calculated using a second weight coefficient larger than the first weight coefficient as the weight coefficient when said determination unit determines that the block image includes the repetitive pattern.

2. The apparatus according to claim 1, wherein said determination unit calculates a total distance by adding the distances between the candidate vector corresponding to the minimum difference and the remaining candidate vectors, and when the total distance is larger than a threshold, determines that the block image of the encoding target image includes the repetitive pattern.

3. The apparatus according to claim 1, further comprising selection unit adapted to select one of the first weight coefficient and the second weight coefficient in accordance with a determination result of said determination unit,
    wherein said motion vector decision unit decides the motion vector based on the cost calculated by one of the first weight coefficient and the second weight coefficient selected by said selection unit.

4. The apparatus according to claim 1, wherein said motion vector decision unit comprises:
    first cost calculation unit for deciding the minimum cost by calculating the cost for each of the plurality of candidate vectors using the first weight coefficient as the weight coefficient; and second cost calculation unit for deciding the minimum cost by calculating the cost for each of the plurality of candidate vectors using the second weight coefficient as the weight coefficient, wherein the motion vector is decided based on one of the minimum costs calculated by said first cost calculation unit and said second cost calculation unit in accordance with a determination result of said determination unit.

5. A motion vector decision method used in a moving image encoding apparatus for performing inter-prediction encoding of an encoding target image using a reference image and a motion vector, comprising:

a vector setting step of sequentially selecting and setting one of a plurality of candidate vectors serving as candidates of the motion vector;

a difference calculation step of calculating a difference in pixel value between a block image included in the encoding target image, and a block image included in the reference image and corresponding to the candidate vector set in the vector setting step;

an order storage step of storing, out of the differences calculated for all of the plurality of candidate vectors, a predetermined number of differences in ascending order;

a vector storage step of storing the predetermined number of candidate vectors corresponding to the differences stored in the order storage step;

a determination step of determining whether the block image of the encoding target image includes a repetitive pattern, based on distances between, out of the predetermined number of candidate vectors stored in the vector storage step, a candidate vector corresponding to a minimum difference stored in the order storage step and remaining candidate vectors;

a vector code amount calculation step of calculating a vector code amount of each of the plurality of candidate vectors; and a motion vector decision step of calculating a cost for each of the plurality of candidate vectors by adding a corresponding difference to a result of multiplication of the vector code amount and a weight coefficient, and deciding a candidate vector with a minimum cost as a motion vector for the block image included in the encoding target image, wherein in the motion vector decision step, the motion vector is decided based on the cost calculated using a first weight coefficient as the weight coefficient when it is determined in the determination step that the block image includes no repetitive pattern, and the motion vector is decided based on the cost calculated using a second weight coefficient larger than the first weight coefficient as the weight coefficient when it is determined in the determination step that the block image includes the repetitive pattern.

6. An image processing apparatus comprising:

a setting unit adapted to set one of a plurality of candidate vectors of an encoding target block;

a first detection unit adapted to obtain a difference between image data of the encoding target block and reference image data corresponding to the candidate vector set by the setting unit;

a first storage unit adapted to store, out of the differences corresponding to the plurality of candidate vectors, a predetermined number of differences in ascending order;

a second storage unit adapted to store information of the candidate vectors corresponding to the differences stored in the first storage unit;

a second detection unit adapted to obtain code amount of each of the plurality of candidate vectors;

a determination unit adapted to obtain a total of vector differences between the candidate vector corresponding to the minimum difference of the predetermined number of differences stored in the first storage unit and each of another candidate vectors stored in the second storage unit, and determine whether or not the total is larger than a threshold;

a decision unit adapted to decide one of the plurality of candidate vectors as a motion vector for encoding image data of the encoding target block in accordance with the difference corresponding to each of the plurality of candidate vectors and a result of multiplication of the code amount and a weight coefficient, wherein the decision unit uses a first weight coefficient if it is determined by the determination unit that the total is equal or smaller than the threshold, and uses a second weight coefficient larger than the first weight coefficient if it is determined by the determination unit that the total is larger than the threshold;

an encoding unit adapted to encode the image data of the encoding target block using the motion vector decided by the decision unit.

7. An image processing method, comprising:

a setting step of setting one of a plurality of candidate vectors of an encoding target block;

a first detection step of obtaining a difference between image data of the encoding target block, and reference image data corresponding to the candidate vector set in the setting step;

a first storage step of storing, out of the differences corresponding to the plurality of candidate vectors, a predetermined number of differences in ascending order;

a second storage step of storing information of the candidate vectors corresponding to the differences stored in the first storage step;

a second detection step of obtaining a code amount of each of the plurality of candidate vectors;

a determination step adapted to obtain a total of vector differences between the candidate vector corresponding to the minimum difference of the predetermined number of differences stored in the first storage step and each of another candidate vectors stored in the second storage step, and determine whether or not the total is larger than a threshold;

a decision step of deciding one of the plurality of candidate vectors as a motion vector for encoding image data of the encoding target block in accordance with the difference corresponding to each of the plurality of candidate vectors and a result of multiplication of the code amount and a weight coefficient, wherein the decision step uses a first weight coefficient if it is determined by the determination step that the total is equal or smaller than the threshold, and uses a second weight coefficient larger than the first weight coefficient if it is determined by the determination step that the total is larger than the threshold, an encoding step of encoding the image data of the encoding target block using the motion vector decided in the decision step.

8. The apparatus according to claim 6, wherein the decision unit adds the difference corresponding to each of the plurality of candidate vectors and the result of multiplication of the code amount and the weight coefficient corresponding to each of the plurality of candidate vectors, and decides the candidate vector corresponding to the minimum value of the adding result among the plurality of candidate vectors as the motion vector for encoding image data of the encoding target block.

9. The apparatus according to claim 6, wherein the encoding unit includes:
   a converting unit that performs an integer conversion process on a difference between the reference image data indicated by the motion vector decided by the decision unit and the image data of the encoding target block;
   a quantization unit that quantizes an output of the conversion unit; and
   an entropy coding unit that encodes an output of the quantization unit by an entropy coding.

10. The apparatus according to claim 9, further comprising:
   an inverse-quantization unit that inverse-quantizes the output of the quantization unit;
   an inverse-conversion unit that performs an inverse integer conversion process on an output of the inverse-quantization unit; and
   an addition unit that adds an output of the inverse-conversion unit and the reference image data indicated by the motion vector decided by the decision unit and outputs the added data as reference image data.

11. The apparatus according to claim 6, further comprising:
   an obtaining unit that obtains image data including the encoding target block and stores the obtained image data in a memory,
   wherein the memory stores the reference image data, and
   wherein the first detection unit reads out from the memory the image data of the encoding target block and the reference image data corresponding to the candidate vector set by the setting unit and obtains the difference.

12. The apparatus according to claim 11, wherein the obtaining unit includes an image pickup unit.

13. The apparatus according to claim 9, further comprising:
   a recording unit that records the image data encoded by the encoding unit on a recording medium.

* * * * *